(12) United States Patent
Iwahashi et al.

(10) Patent No.: US 7,890,671 B2
(45) Date of Patent: Feb. 15, 2011

(54) PROGRAM INITIATION CONTROL APPARATUS

(75) Inventors: Kenji Iwahashi, Osaka (JP); Yoshihisa Shimazu, Kyoto (JP)

(73) Assignee: Panasonic Corporation, Osaka (JP)

( * ) Notice: Subject to any disclaimer, the term of this patent is extended or adjusted under 35 U.S.C. 154(b) by 441 days.

(21) Appl. No.: 11/896,358

(22) Filed: Aug. 31, 2007

(65) Prior Publication Data
US 2008/0059662 A1   Mar. 6, 2008

(30) Foreign Application Priority Data
Sep. 5, 2006   (JP)   .............. 2006-240047

(51) Int. Cl.
*G06F 3/00* (2006.01)
*G06F 13/00* (2006.01)
(52) U.S. Cl. ................. 710/22; 710/5; 710/33
(58) Field of Classification Search ............. None
See application file for complete search history.

(56) References Cited

U.S. PATENT DOCUMENTS

| | | |
|---|---|---|
| 7,006,377 B2 | 2/2006 | Oh |
| 2002/0108003 A1* | 8/2002 | Ellis et al. ............ 710/39 |
| 2004/0064606 A1* | 4/2004 | Kimura ............ 710/56 |
| 2005/0120146 A1 | 6/2005 | Chen et al. |
| 2005/0246518 A1* | 11/2005 | Takahashi ............ 713/2 |
| 2006/0245274 A1 | 11/2006 | Choi et al. |

FOREIGN PATENT DOCUMENTS

| | | |
|---|---|---|
| JP | 2002-278781 | 9/2002 |
| WO | WO 01/52062 A3 | 7/2001 |

OTHER PUBLICATIONS

Lee, Insup, Computer Operating Systems, Lecture note on disk IO [Online], Fall 2003 [retrieved on Nov. 4, 2010], Retrieved from the Internet: URL: http://www.cis.upenn.edu/~lee/03cse380/lectures/In14-io-v2.ppt.*

* cited by examiner

*Primary Examiner*—Tariq Hafiz
*Assistant Examiner*—Scott Sun
(74) *Attorney, Agent, or Firm*—McDermott Will & Emery LLP

(57) ABSTRACT

A CPU reads a system initialization program from a first recording area and stores the read system initialization program to an internal memory, and then reads the system initialization program from the internal memory and executes the system initialization and initialization of a second recording area. A DMA control unit transfers a system control program included in the program from the first recording area to the second recording area without through the CPU. A memory management unit manages a processing state of the transfer of the system control program to the second recording area by the DMA control unit. The CPU reads the program from the second recording area and executes the system control in collaboration with the memory management unit.

18 Claims, 9 Drawing Sheets

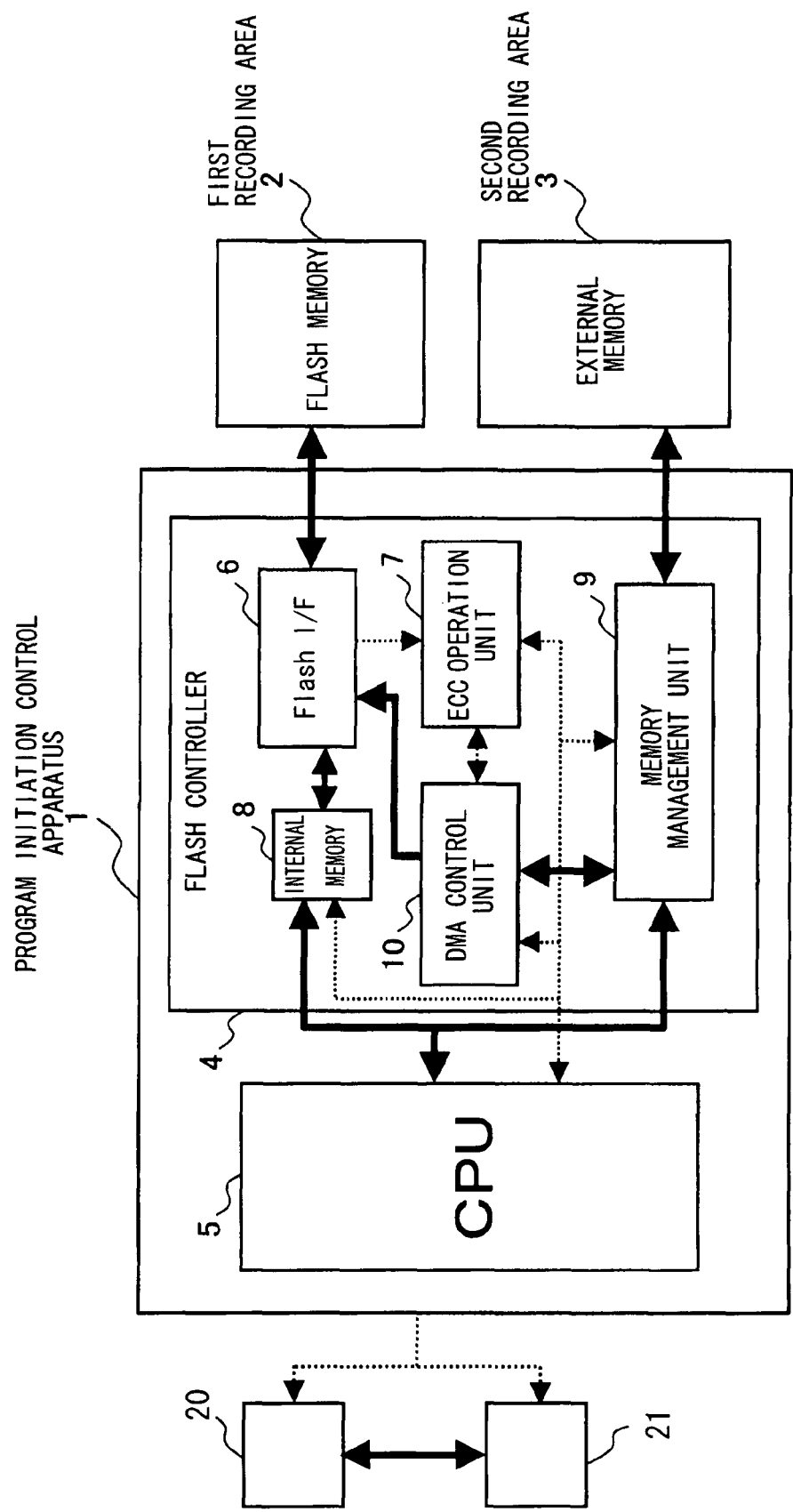
F I G. 1

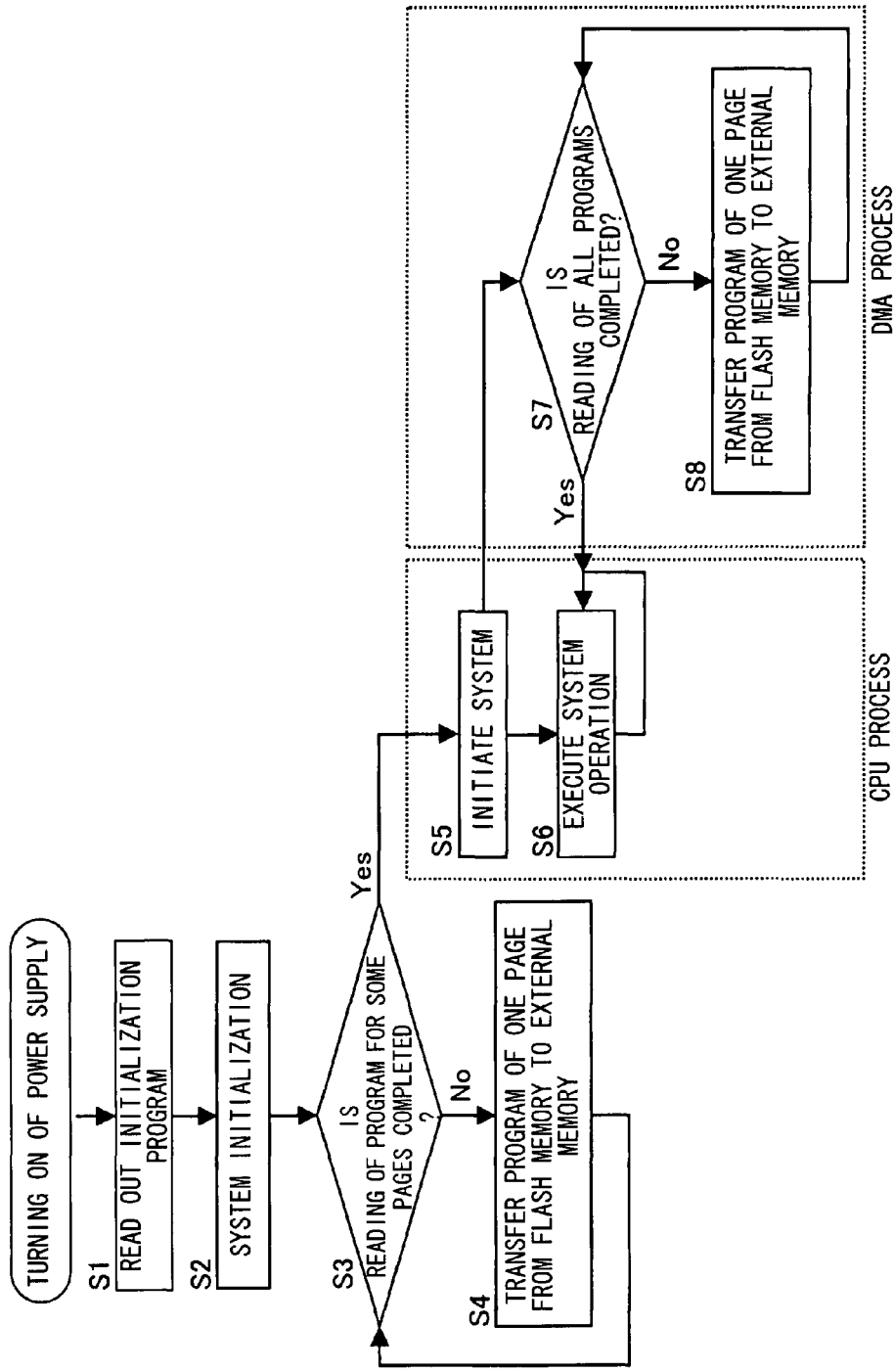
F I G. 2

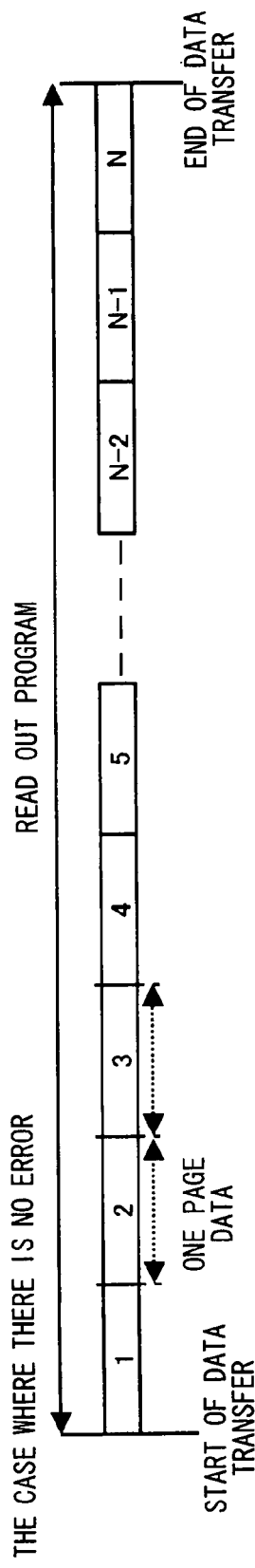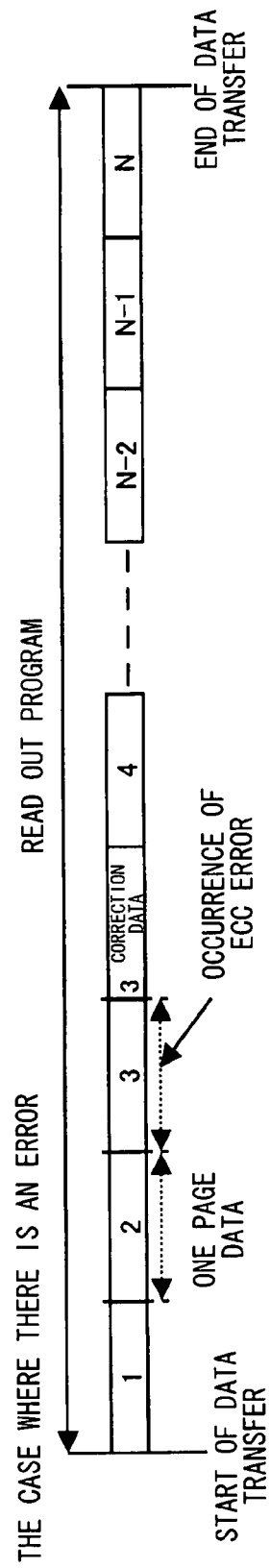

F I G. 7
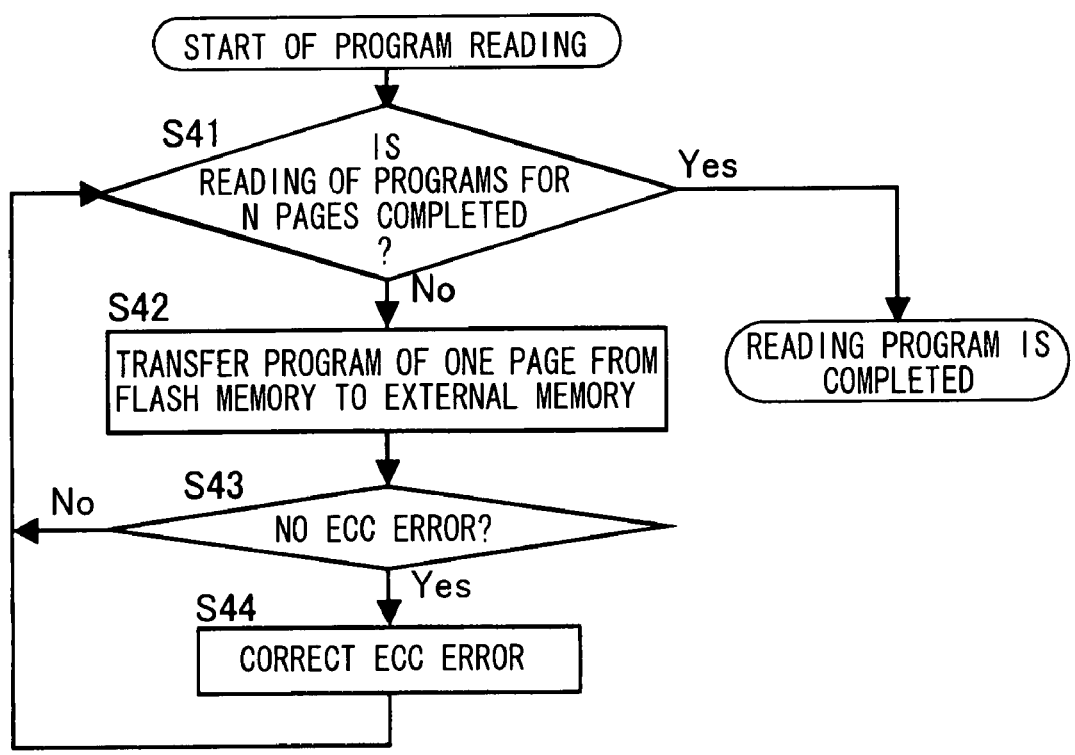

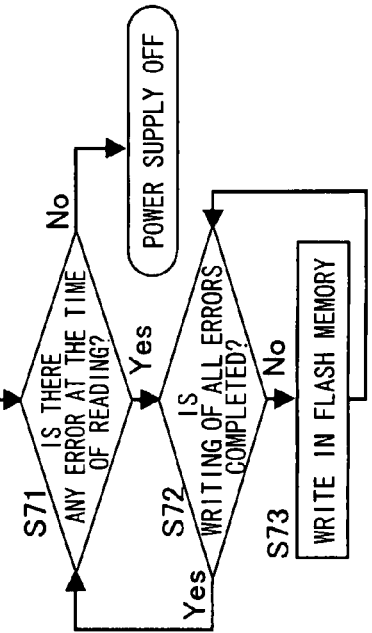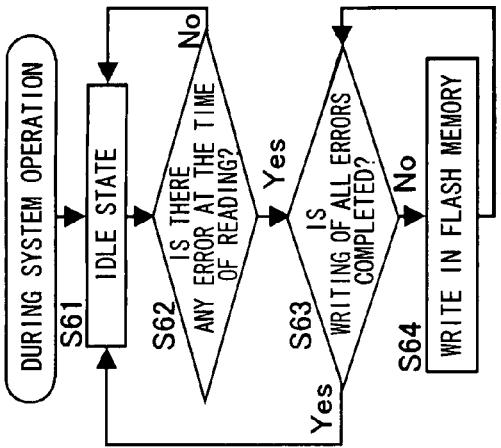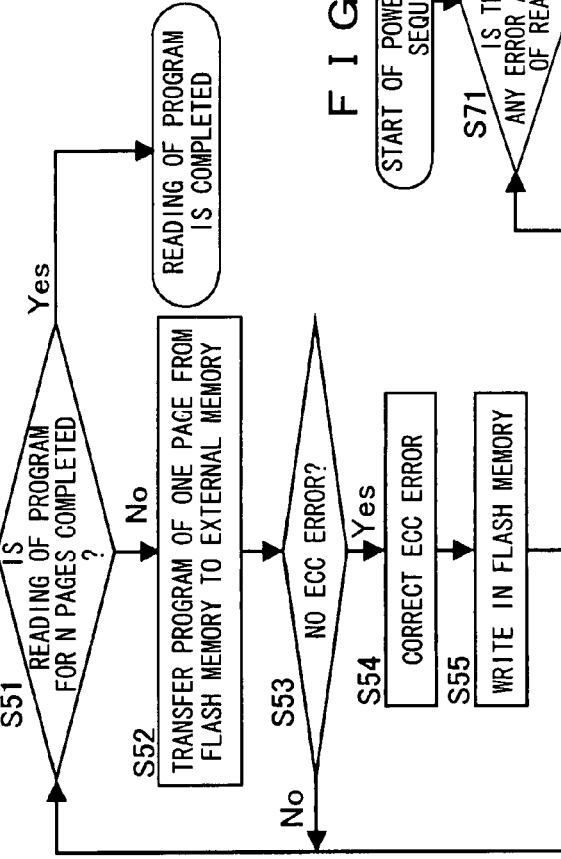

PROGRAM INITIATION CONTROL APPARATUS

BACKGROUND OF THE INVENTION

1. Field of the Invention

The present invention relates to a program initiation control apparatus which transfers programs between a first recording area, such as a flash memory, and a second recording area, such as an external memory, and reads the programs sequentially from the first recording area.

2. Description of the Related Art

In a flash memory to be in heavy usage as a storage of a program etc., there are a NOR type and a NAND type when dividing roughly. Although the NOR type flash memory allows the random access by one byte unit, its cost is higher and its scale of integration is lower compared with the NAND type. On the other hand, although the NAND type flash memory is less expensive and its scale of integration is higher compared with the NOR type, its minimum unit of random access is larger than that of the NOR type, and the random access reading is slow. Therefore, a program where the random access needs to be made to a recording area cannot be executed directly from a state where the program is stored in a recording area of the NAND type flash memory.

In order to avoid this inconvenience, there is disclosed a method of executing a program stored in a NAND type flash memory after the entire program is transferred to another memory where the random access is possible by one byte unit. (For example, refer to Japanese Patent Publication Laid-open No. 2002-278781).

When using a program stored in a NAND type flash memory, there is an initiation method, where the program is transferred to a RAM area in which random access is possible, a CPU starts reading the program from the RAM area after the completion of the transfer, and the a system is initiated. However, since the system can be initiated according to this initiation method only after the entire program is transferred, a great deal of time is required for initiating the system.

SUMMARY OF THE INVENTION

Therefore, the main object of the present invention is to provide a program initiation control apparatus that shortens system initiation time and reduces the initiating time to a minimum in the case where a program size increases.

A program initiation control apparatus in accordance with the present invention is a program initiation control apparatus which reads programs in sequence from a first recording area via a second recording area, the first recording area having two or more memory blocks, each memory block including a record part group numbered in order each comprising one or more memory pages, the programs being stored in the aforementioned record part group, the second record area allowing random access in a unit smaller than the memory page, the program initiation control apparatus including:

an internal memory configured to store a system initialization program included in the programs;

a CPU configured to read the system initialization program from the first recording area and transfer the read system initialization program to the internal memory, and then read the system initialization program from aforementioned internal memory and execute the system initialization and initialization of the second recording area;

a DMA control unit configured to transfer a system control program included in the programs from the first recording area to the second recording area without through the CPU; and a memory management unit configured to manage a processing state of the transfer of the system control program to the second recording area by the DMA control unit; wherein the CPU reads the programs from the second recording area and executes the system control in collaboration with the memory management unit.

In this configuration, at an initial stage of the operation, the initialization program is read from the first recording area and then stored in the internal memory. The CPU initializes the system according to the initialization program read from the internal memory. As a result, the access to the second recording area is made possible. Next, the DMA control unit reads the system initiation program from the first recording area, and transfers the read system initiation program directly to the second recording area without through the CPU. The memory control unit supervises the program transfer at this time. When the transfer of the system initiation program is completed, the CPU initiates the system according to the program read from the second recording area in collaboration with the memory management unit. The DMA control unit reads the system control program from the first recording area repeatedly by one-page unit in parallel with the reading operation/system operation by the CPU, and then transfers the system control program directly to the second recording area without through the CPU. Thus, since the system initiation operation and the program reading operation are processed in parallel, the system initiation time is shortened, and the initiating time can be reduced to the minimum when a program size increases.

In the present invention, there is an aspect in which:

the internal memory stores the system initialization program read from the first recording area when a power supply is turned ON; the CPU enables access to the second recording area by reading the system initialization program from the internal memory and initializing the system according to the aforementioned system initialization program;

the DMA control unit repeats a process of reading the system initiation program required at the minimum for system initiation included in the program from the first recording area by one-page unit after the system initialization and transferring the read program to the second recording area until the process of transferring the system initiation program required at the minimum in the required number of pages for system initiation is completed;

the memory management unit checks whether or not the program read from the second recording area by the CPU is stored in the second recording area;

When the memory management unit confirms that the system initiation program required at the minimum in the required number of pages for system initiation is stored in the second recording area, the CPU reads the system initiation program required at the minimum in the required number of pages for system initiation from the second recording area and then initiates the system; and the DMA control unit repeats the process of reading the system control program from the first recording area by one-page unit and transferring the read system control program to the second recording area without through the CPU, in parallel with the system initiation of the CPU and the system operation subsequent to the system initiation, until the transfer process of all of the system control program is completed.

In this configuration, when the power supply is turned ON, the initialization program is read from the first recording area and is stored in the internal memory. The CPU initializes the system according to the initialization program read from the internal memory. As a result, the access to the second recording area is made possible. Next, the DMA control unit reads the system initiation program required at the minimum for system initiation from the first recording area repeatedly by one-page unit, and then transfers the read system initiation program directly to the second recording area without through the CPU. Such process of reading one-page unit is repeated until the transfer of the system initiation program equivalent to the required number of pages for system initiation is completed. The memory control unit supervises the program transfer at this time.

When the transfer of the system initiation program equivalent to the required number of pages for system initiation is completed, the CPU initiates the system according to the program read from the second recording area in collaboration with the memory management unit. The DMA control unit reads the system control program from the first recording area repeatedly by one-page unit in parallel with as the reading operation of the system initiation program and the system operation by the CPU, and transfers the system control program directly to the second recording area without through the CPU, and repeats the reading in one-page unit until transfer of all system control programs is completed. Thus, since the system initiation operation and the program reading operation are processed in parallel, the system initiation time is shortened.

There is an aspect of the present invention in which the CPU reads the stored program from the second recording area and then controls the system, during the transfer process of the program by the DMA control unit (parallel processing).

There is an aspect of the present invention in which when the CPU reads a program non-stored area in the second recording area, the memory management unit makes the reading process by the CPU stand by until the program transfer process to the aforementioned program non-stored area is completed.

There is an aspect of the present invention in which an ECC operation unit for executing ECC operation of the program transferred from the first recording area to the second recording area by one-page unit is further included; and the DMA control unit transfers the program by plural page unit.

Here, it is preferable that:

when the ECC operation unit detects the occurrence of a 1-bit error, the ECC operation unit corrects the detected 1-bit error; and the DMA control unit comprises a buffer for one page or more and transfers data in which the 1-bit error was corrected to the second recording area.

Moreover, it is preferable that the ECC operation unit notifies the occurrence of the 1-bit error to the CPU and the memory management unit.

Here, it is preferable that the CPU and the memory control unit write the data for one memory block of the second recording area including the data after the correction in an area different from the area before correction of the first recording area based on the notice of the occurence of the 1-bit error, and then read data from the different area in the first recording area at the time of next reading.

Here, it is preferable that the CPU and the memory management unit perform writing operation after the notice of the occurrence of the 1-bit error.

Here, it is preferable that the CPU and the memory management unit write the data for one memory block of the second recording area including the data after the correction in an area different from the area before correction in the first recording area during an idle period of the system by recording the sector of the first recording area where the occurrence of the 1-bit error was notified.

Here, it is preferable that the CPU and the memory management unit write the data for one memory block of the second recording area including the data after the correction in an area different from the area before correction in the first recording area at a power supply OFF sequence by recording the sector of the first recording area where the occurrence of the 1-bit error was notified.

There is an aspect of the present invention in which the memory management unit manages an address in the second recording area where the program transfer was executed and an address in the second recording area that the CPU reads.

There is an aspect of the present invention in which the memory management unit transfers the program to the second the recording area from the first recording area by a page unit, and, when the reading process by the CPU is made to stand by, manages the transfer of the program by the CPU by a page unit by notifying such effect to the DMA control unit.

There is an aspect of the present invention in which the memory management unit manages an address in the second recording area where the program transfer was executed and an address in the second recording area that the CPU reads, by means of software.

There is an aspect of the present invention in which when the reading process by the CPU is made to stand by, the memory management unit notifies said effect to the DMA control unit and interrupts the reading process by a page unit, and when the reading process is restarted, the memory management unit gives priority to the transfer of the program in the first recording area that corresponds to an address in the second recording area that the CPU reads.

There is an aspect of the present invention in which the program transferred to the second the recording area from the first recording area is devided into the plural program units; and the CPU transfers programs sequentially from a program unit needed in the process with a high process priority in the system.

There is an aspect of the present invention in which the image pickup apparatus includes:

the program initiation control apparatus mentioned above;

an image sensor; and an image display monitor.

According to the present invention, since the system initiation operation and the program reading operation are processed in parallel, the system initiation time is shortened, and the initiating time can be reduced to a minimum even when a program size increases. Moreover, even when the program cannot be normally read due to corruption of part of a block inside the first recording area, the corresponding normal program can be read from any of other blocks and risk reduction can be effectively achieved.

Since the program initiation control apparatus of the present invention uses the DMA control when initiating the system by the transferred program after transferring the program in the first recording area to the second recording area allowing random access provided outside, the system operation and the program transfer can be processed in parallel. As a result, shortening the system initiation time is made possible.

BRIEF DESCRIPTION OF THE DRAWINGS

If the embodiments of the present invention described hereinafter are understood, other objects of the present invention become clear. The other objects will be specified in the attached claims. And, if this invention is implemented, those skilled in the art conceive of a lot of profits that were not specified in this specification.

In the Drawings:

FIG. 1 is a block diagram showing a configuration of a program initiation control apparatus, a flash memory and an external memory according to an embodiment of the present invention;

FIG. 2 is a flow chart showing the operation of system initiation of the program initiation control apparatus according to the embodiment of the present invention;

FIG. 6A is a figure showing processing executed in the case an ECC error does not occur during program transferring according to the embodiment of the present invention;

FIG. 6B is a figure showing processing executed in the case the ECC error occurs during the program transferring according to the embodiment of the present invention;

FIG. 7 is a flow chart showing processing executed when the ECC error occurs during the program transferring according to the embodiment of the present invention;

FIG. 8A is a flow chart (No. 1) showing processing of data correction executed when an error occurs according to the embodiment of the present invention;

FIG. 8B is a flow chart (No. 2) showing processing of data correction executed when the error occurs according to the embodiment of the present invention;

FIG. 8C is a flow chart (No. 3) showing processing of data correction executed when the error occurs according to the embodiment of the present invention.

DETAILED DESCRIPTION OF THE INVENTION

Figure 3:
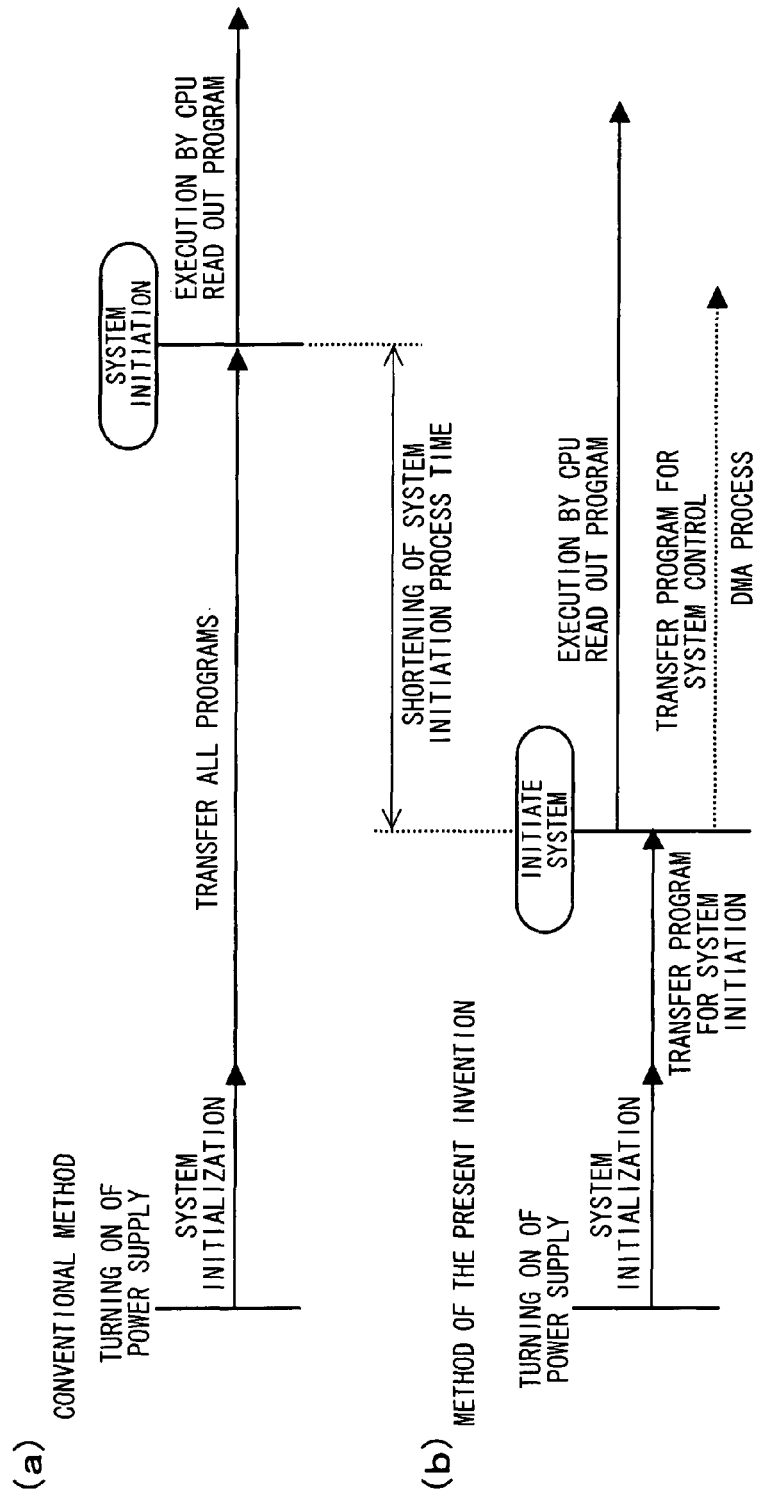
FIG. 3 is a figure showing time up to the system initiation according to the embodiment of the present invention by putting such time in contrast with that of the conventional technology.

Hereafter, embodiments of a program initiation control apparatus related to the present invention are explained in detail referring to the drawings.

FIG. 1 is a block diagram showing a configuration of a program initiation control apparatus 1, a flash memory 2, and an external memory 3 according to an embodiment of the present invention. The program initiation control apparatus 1 reads programs in sequence from the flash memory (a first recording area) via the external memory 3 (a second recording area). The flash memory 2 includes two or more memory blocks, each memory block including a record part group numbered in order, each comprising one or more memory pages, and programs are stored by the record part group. Although it is possible to access a flash memory in a page unit, it is impossible to make random access to the flash memory in one byte unit. The external memory 3 is a memory that allows random access in a unit (one byte unit) smaller than a memory page. The programs stored in the flash memory 2 include an initialization program (boot program), a system initiation program and a system control program.

The Program initiation control apparatus 1 includes a flash controller 4 for controlling an interface of the flash memory 2, and a CPU 5 for controlling the system. The flash controller 4 includes a flash interface (hereafter, it is called "flash I/F") 6, an ECC operation unit 7, an internal memory 8 of small capacity, a memory management unit 9, and a DMA control unit 10. The flash I/F 6 executes input/output control in accordance with specifications of an interface of the flash memory 2. The ECC operation unit 7 executes an error check of reading/writing data from/to the flash memory 2. The internal memory 8 can be accessed by the flash I/F 6 and the CPU 5, and allows random access by one byte unit. When the CPU 5 reads a program transferred from the flash memory 2 to the external memory 3 from the external memory 3, the memory management unit 9 checks whether or not the transfer of the corresponding program to the external memory 3 is completed. The DMA control unit 10 transfers a program directly from the flash memory 2 to the external memory 3 without through the CPU 5. In addition, the configuration may be such that that the function of the ECC operation unit 7 can be added to the CPU 5. Moreover, when the flash memory 2 that executes ECC operation internally is used, the ECC operation unit 7 may be omitted. Moreover, the process of checking whether or not the transfer of the program from the flash memory 2 to the external memory 3 is completed may be performed by software of the CPU 5.

The CPU 5 reads a stored program from the external memory 3 and controls the system during the transfer process of a program by the DMA control unit 10. The memory management unit 9 makes the reading process by the CPU 5 stand by, when the CPU 5 reads the program non-stored area in the recording area of the external memory 3, until the program transferring process to this program non-stored area is completed. The CPU 5 and the memory management unit 9 write data for one memory block of the external memory 3 including the data after correction in an area different from the area before correction of the flash memory 2 based on the notice of the occurence of a 1-bit error by the ECC operation unit 7, and then read data from a different area in the recording area of the flash memory 2 at the time of next readout. The CPU 5 and the memory management unit 9 execute write-in operation after the notice of the occurrence of the 1-bit error by the ECC operation unit 7. The CPU 5 and the memory management unit 9 write data for one memory block of the external memory 3 including the data after correction in an area different from the area before the correction of the flash memory 2 in an idle period of the system by recording a sector of the flash memory 2 of which the occurrence of the 1-bit error is notified by the ECC operation unit 7. The CPU 5 and the memory management unit 9 write data for one memory block of the external memory 3 including the data after correction in an area different from the area before the correction of the flash memory 2 at a power supply OFF sequence of the system by recording a sector of the flash memory 2 of which the occurrence of the 1-bit error is notified. The memory management unit 9 manages an address of the external memory 3 that executed the program transfer and an address of the external memory 3 that the CPU 5 reads. The memory management unit 9 manages this transfer control by means of software. The memory management unit 9 manages the transfer of programs by the CPU 5 in page unit by transferring programs in page unit from the recording area of the flash memory 2 to the recording area of the external memory 3, and, when making the reading process by the CPU stand by, by notifying such effect to the DMA control unit 10. When making the reading process by the CPU stand by, the memory management unit 9 notifies such effect to the DMA control unit 9 and interrupts the reading process in page unit. Furthermore, at the time of the restart of readout processing, the memory management unit 9 gives top priority to the transfer of the program in the recording area of the flash memory 2 that corresponds to the address of the external memory 3 that the CPU 5 reads. The program transferred from the recording area of the flash memory 2 to the recording area of the external memory 3 is divided into two or more program units, and the CPU 5 transfers program units sequentially from the program unit needed in the process with a high process priority in the system.

Figure 9:
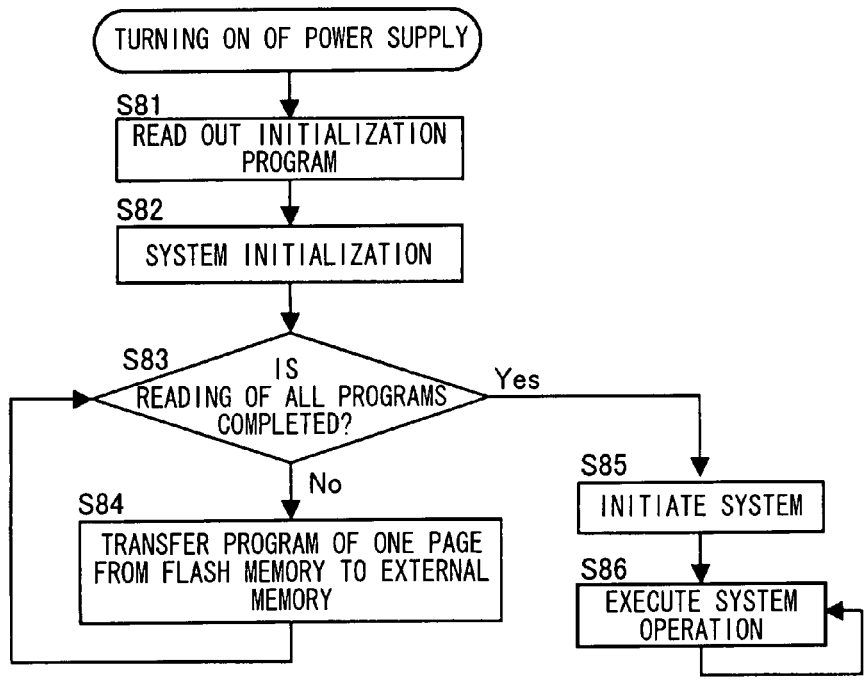
FIG. 9 is a flow chart showing the operation of system initiation in the prior art.

For the purpose of contradistinction, the operation of the system initiation in the prior art will be beforehand explained referring to a flow chart of FIG. 9. When the power supply is turned ON, the CPU 5 reads an initialization program of the system (boot program) from the flash memory 2 to the internal memory 8 in Step S81. Next, in Step S82, the CPU 5 reads the initialization program from the internal memory 8, and initializes the system according to the contents of the read initialization program. Next, in Steps S83 and S84, the CPU 5 transfers a system initiation program from the flash memory 42 to the external memory 3. In that case, data transfer is repeated by one-page unit until the transfer of the required transfer program is completed. When all programs are transferred from the flash memory 2 to the external memory 3, in Step S85, the CPU 5 reads the program from the external memory 3, and initiates the system according to the read program. Next, in Step S86, the system operation is executed.

FIG. 2 is a flow chart showing the operation of the system initiation in the embodiment of the present invention. When the power supply is turned ON, in Step S1, the flash controller 4 reads a system initialization program from the flash memory 2 by one-page unit, and stores the read program in the internal memory 8. Details of this storing process are as follows. First of all, the flash controller 4 stores the read initialization program after reading the initialization program from the flash memory 2 in the internal memory 8 by effecting its operation and issuing a prescribed command to the flash memory 2 through the flash I/F 6. At this time, the ECC operation unit 7 executes an ECC operation in order to judge whether or not the data of the read initialization program has an error. When any error is detected, the ECC operation unit 7 corrects the error. When the error cannot be corrected, the ECC operation unit 7 outputs a signal indicating the occurrence of the error to other external (parts that mainly configure the program initiation control apparatus).

Next, in Step S2, the flash controller 4 releases reset of the CPU 5. According to this, the CPU 5 reads the initialization program from the internal memory 8, and initializes the system on the basis of the contents of the read initialization program. As a result, the access to the external memory 3 becomes possible.

Next, in Steps S3 and S4, the DMA control unit 10 reads a system initiation program which is necessary at the minimum for initiating the system, from the flash memory 2 through the flash I/F 6 by one-page unit, and then transmits the read program to the external memory 3. The DMA control unit 10 repeats the above-mentioned reading process for one-page unit until the transfer of the system initiation program required at the minimum is completed. At this time, the memory management unit 9 manages the process of readout/transfer so that the transferred system initiation program is arranged in a transfer-target area of the external memory 3. The ECC operation unit 7 also operates at the time of the program transfer. The ECC operation unit 7 which starts its operation checks whether or not a data error occurs during the program transfer. When the ECC operation unit 7 confirms that error data has occurred, the ECC operation unit 7 corrects the error data under the transfer through the DMA control unit 10. The DMA control unit 10 transfers the corrected data to the external memory 3. In addition, after the error data detection in the ECC operation unit 7 and the notification of the detection result to the DMA control unit 10 and the CPU 5, the CPU 5 which received the notice of the occurrence of the error data may implement the correction of the error data in the data under the transfer through the DMA control unit 10.

When the system initiation program required at the minimum for the system initiation is transferred from the flash memory 2 to the external memory 3, in Step S5, the CPU 5 reads the system initiation program from the external memory 3, and then initiates the system according to the read program.

Next, in Step S6, the CPU 5 reads a system control program from the external memory 3, and then executes the system operation. When the system control program is read, the memory control unit 9 checks whether or not the transfer of the read system control program to the external memory 3 is completed. When determining an appropriate program not being transferred, the memory management unit 9 makes the reading process by the CPU stand by until the appropriate program is transferred to the external memory 3, and then allows the reading process of the program by the CPU 5 to be resumed after the transferring process is completed.

In Steps S7 and S8 in parallel with Steps S5 and S6, the DMA control unit 10 repeats the process of transferring the system control program from the flash memory 2 to the external memory 3 by one-page unit through the flash I/F 6 until the transfer of all system control programs is completed. At this time, it is checked whether or not the transferred data has an error by the ECC operation unit 7, and management information in the transferred area is updated by the memory management unit 9. The data transfer by the DMA control unit 10 is implemented while these processes (a check for a data error and management process in the transfer area) are being executed. In addition, when processes up to the system initiation can be executed in Step S2, it is possible to omit Steps S3 and S4 and to execute the process of Step S5 directly.

FIG. 3 shows the time up to the system initiation. As is evident from FIG. 3, in the embodiment of the present invention, since the system is initiated after the system initiation program required at the minimum for the system initiation is read, the initiating time can be shorten compared with the conventional technology.

Figure 4:
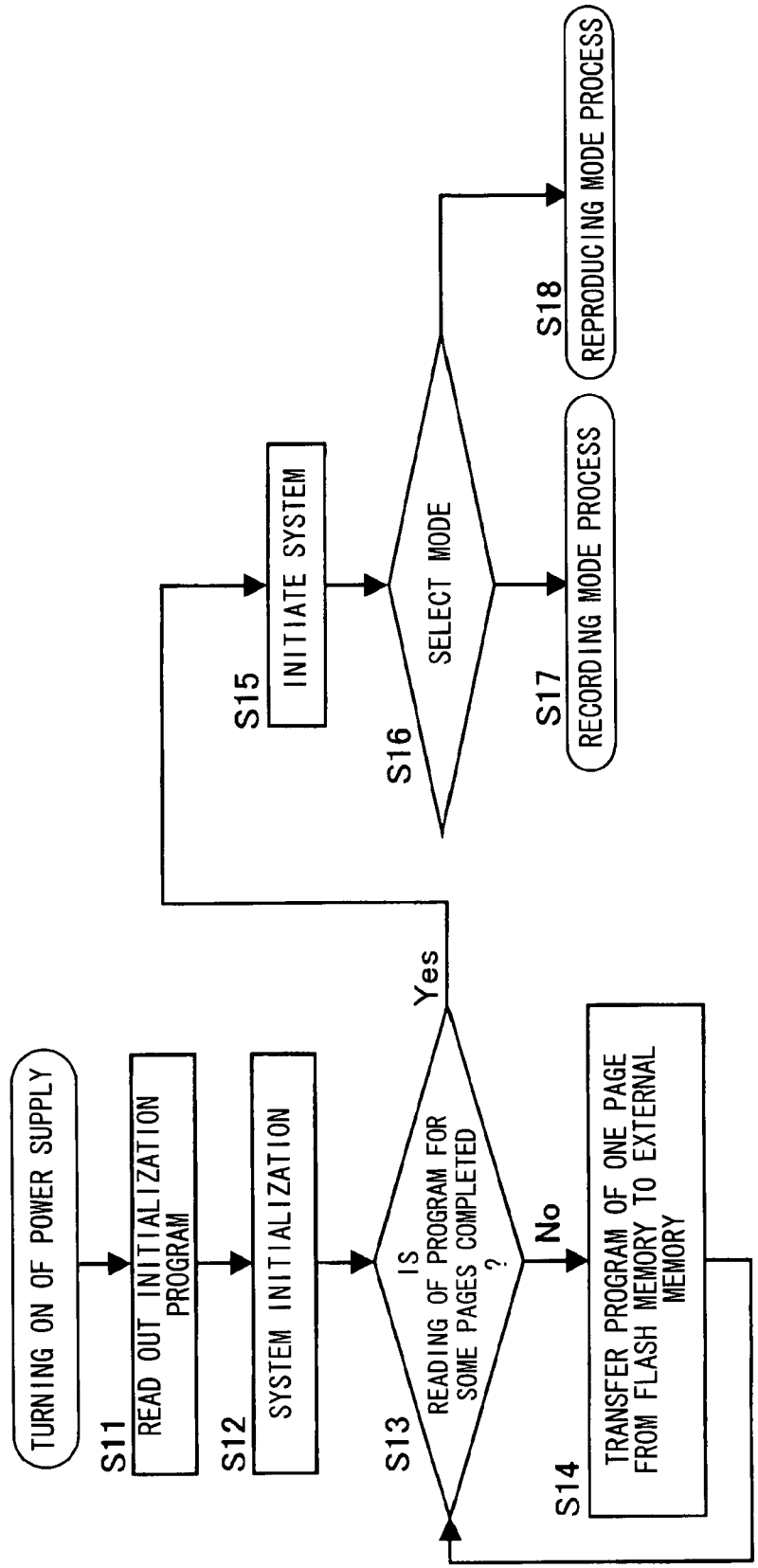
FIG. 4 is a flow chart (No. 1) showing initiation sequence of a camera according to the embodiment of the present invention.

The system initiation of an image pickup apparatus is explained as a concrete example referring to the flow charts of FIG. 4 and FIG. 5. As shown in FIG. 1, this image pickup apparatus includes the program initiation control apparatus 1, an image sensor 20, and an image display monitor 21.

In initiation Step S11, the flash controller 4 reads the initialization program (boot program) from the flash memory 2 by one-page unit through the flash I/F 6, and then stores the read data in the internal memory 8. In that case, the ECC operation unit 7 checks whether or not there is any data error.

Next, in Step S12, the flash controller 4 releases reset of the CPU 5, and the CPU 5 reads the initialization program from the internal memory 8 and then initializes the system according to the contents of the read initialization program. As a result, the access to the external memory 3 becomes possible.

Next, in Steps S13 and S14, the DMA control unit 10 reads the system initiation program (such as a control program of peripheral circuits, and a program for recognizing a camera mode) required at the minimum for the system initiation, from the flash memory 2 through the flash I/F 6 by one-page unit, and then transmits the read program to the external memory 3. This transfer process is repeated until the transfer of the system initiation program required at the minimum is completed. At this time, the memory management unit 9 manages the process of data transfer so that the transferred system initiation program is arranged in in a transfer-target area of the external memory 3. Moreover, the ECC operation unit 7 also operates at the time of the program transfer. The ECC operation unit 7 which starts its operation checks whether or not a data error occurs during the program transfer. When the ECC operation unit 7 confirms that error data has occurred, the ECC operation unit 7 corrects the error data under the transfer through the DMA control unit 10. The DMA control unit 10 transfers the corrected data to the external memory 3.

Next, in Step S15, the CPU 5 reads the system initiation program (such as a control program of peripheral circuits, and a program for recognizing a camera mode) from the external memory 3, and then initiates the system according to the read system initiation program.

Figure 5B:
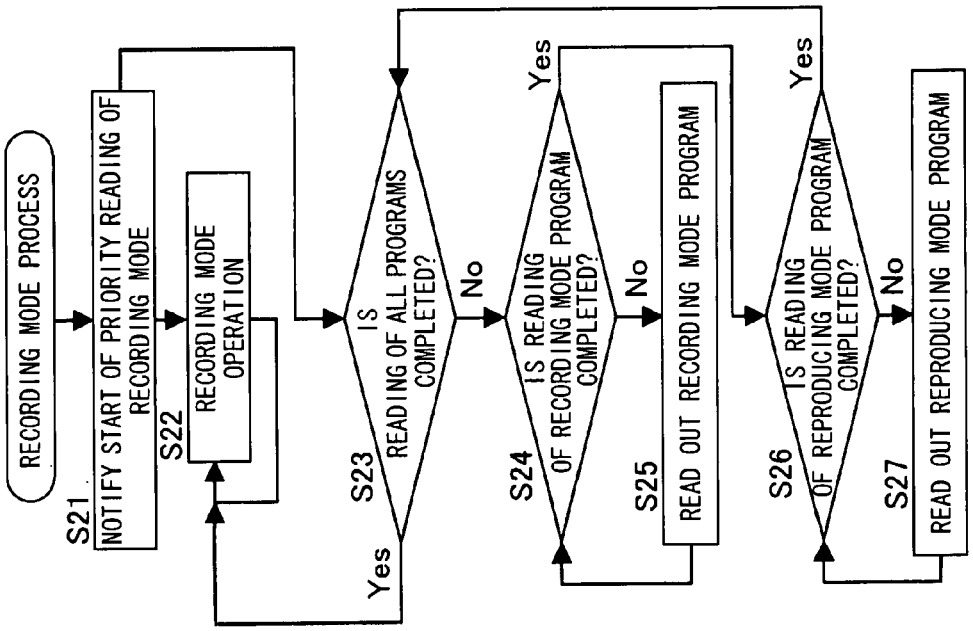
FIG. 5B is a flow chart (reproducing mode) showing the initiation sequence of the camera according to the embodiment of the present invention.
Figure 5A:
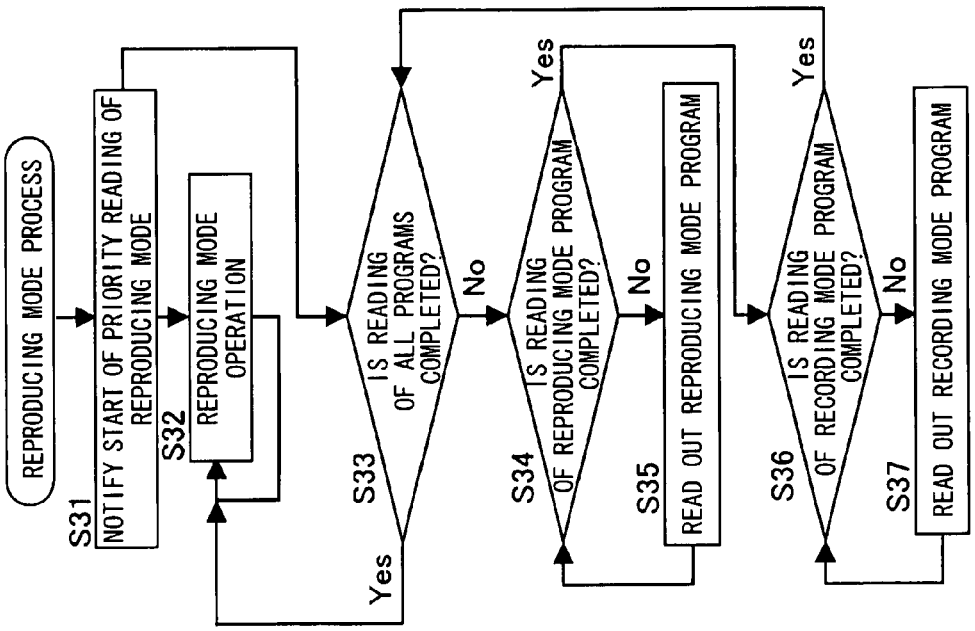
FIG. 5A is a flow chart (initiation mode) showing the initiation sequence of the camera according to the embodiment of the present invention.

Next, in Step S16, the CPU 5 determines information on the camera mode. The following processes are divided into the recording mode process in step S17 and the reproducing mode process in step S18 on the basis of the determination by the CPU 5 in step S16. First of all, the process in the recording mode process is explained. In this case, Steps S21 to S27 shown in FIG. 5A are executed. That is, in Step S21, the CPU 5 notifies the flash controller 4 that the CPU selectively reads the program needed in the recording mode out of all of the programs in the system. Next, in Step S22, the CPU 5 reads a program for the recording mode from the external memory 3, and then controls the recording mode.

Next, in Step S23, the DMA control unit 10 reads the program from the flash memory 2 by one-page unit until reading of all programs is completed, and then the DMA control unit 10 transfers the read programs corresponding to the read pages directly to the external memory 3 to store the transferred programs. In that case, the ECC operation unit 7 checks whether or not the data under the transfer has an error.

Next, in Steps S24 and S25, the DMA control unit 10 reads programs prepared for the recording mode out of all programs from the flash memory 2 by one-page unit through the flash I/F 6, and then transfers the read programs corresponding to the read pages directly to the external memory 3 to store the transferred programs. The ECC operation unit 7 checks whether or not the data has an error while the data is being transferred.

Next, in Steps S26 and S27, the DMA control unit 10 executes the system operation of all programs by reading the program prepared for the reproducing mode out of all programs from the flash memory 2 by one-page unit through the flash I/F 6, and then transferring the read programs corresponding to the read pages directly to the external memory 3 to store the transferred programs. The ECC operation unit 7 checks whether or not the data has an error while the data is being transferred.

Next, the process in the reproducing mode process is explained. In this case, Steps S31 to S37 shown in FIG. 5B are executed. That is, in Step S31, the CPU 5 notifies the flash controller 4 that the CPU 5 selectively reads the program needed in the reproducing mode out of all programs in the system. Next, in Step S32, the CPU 5 reads a program for the reproducing mode from the external memory 3, and then controls the recording mode.

Next, in Step S33, the DMA control unit 10 reads the program from the flash memory 2 by one-page unit until reading of all programs is completed, and then the DMA control unit 10 transfers the read program corresponding to the read pages directly to the external memory 3 to store the transferred program. In that case, the ECC operation unit 7 checks whether or not the data under the transfer has an error.

Next, in Steps S34 and S35, the DMA control unit 10 reads a program prepared for the reproducing mode out of all programs from the flash memory 2 by one-page unit through the flash I/F 6, and then transfers the read programs corresponding to read pages directly to the external memory 3 to store the transferred program. The ECC operation unit 7 checks whether or not the data has an error while the data is being transferred.

Next, in Steps S36 and S37, the DMA control unit 10 executes the system operation of all programs by reading the program prepared for the recording mode out of all programs from the flash memory 2 by one-page unit through the flash I/F 6, and then transferring the read programs corresponding to the read pages directly to the external memory 3 to store the transferred program. The ECC operation unit 7 checks whether or not the data has an error while the data is being transferred.

The operation of the CPU 5 and the DMA control unit 10 (hereafter, it is called "transfer operation indication unit") at the time when an ECC error occurs during the program transfer is explained referring to FIG. 6A, FIG. 6B, and FIG. 7. FIG. 6A shows the state of the process when the error of the program reading does not occur, FIG. 6B shows the state of the process when the error occurs, and FIG. 7 shows the process flow of the aforementioned processes. As is evident from these figures, when an error occurs, the corrected data is sent again to the external memory 3 after the error is corrected.

In the flow chart of FIG. 1, in Step S41, the transfer operation indication unit determines whether or not reading of N pages worth of programs including used programs is completed. The transfer operation indication unit executes the processes in Steps S42 to S44 explained hereinafter until it is determined in Step S41 that determining the above-mentioned reading process is completed.

First of all, in Step S42, the transfer operation indication unit reads programs for one page from the flash memory 2, and then transfers the read programs to the external memory 3. Next, in Step S43, the transfer operation indication unit makes the ECC operation unit 7 checks whether or not an error has occurred. When confirmed that the error has occurred, next, in Step S44, the transfer operation indication unit makes the data corrected based on error information, and then transfers the corrected data to the external memory 3.

FIG. 8A to FIG. 8C are process flows showing the operation of the writing process in which corrected data is written when the error occurred, and the corrected data is read from next time. The data corruption occurs in the flash memory 2 on the page where an error occurred. Thus, the transfer operation indication unit writes the corrected data in a spare area of the flash memory 2, and reads out data from the area where the corrected data is stored in reading data from next time.

Steps S51 to S55 shown in FIG. 8A are process flows of writing programs in the middle of reading programs. First of all, in Step S51, the transfer operation indication unit determines whether or not reading N pages worth of programs including used programs is completed. When determining that reading is non-completion in Step S51, the transfer operation indication unit executes the processes Step S52 to S55 explained below.

In Step S52, the transfer operation indication unit reads programs for one page from the flash memory 2, and transfers the read program of one page's worth to the external memory 3. Next, in Step S53, the ECC operation unit 7 checks whether or not the error has occurred. When confirmed that the error has occurred, next, in Step S54, the ECC operation unit 7 corrects the data based on error information, and transfers the corrected data to the external memory 3. Next, in Step S55, the ECC operation unit 7 writes the data corrected in step S54 in the flash memory 2.

Steps S61 to S64 shown in FIG. 8B are process flow for implementing writing of data during idle time of the system. As shown in Step S61, this process flow is based on the assumption that the system is idle and there is no access to the flash memory 2. The processes in the following Steps S62 to S64 are implemented on the basis of such assumption.

Firstly, in Step S62, the ECC operation unit 7 checks whether or not the error has occurred when the data transfer is implemented from the flash memory 2 to the external memory 3 at the idle state. When the ECC operation unit 7 determines that the error has not occurred, the transfer operation indication unit returns to Step S61 to shift the system to the idle state. When the ECC operation unit 7 determines that the error is occurred, next, the transfer operation indication unit and the ECC operation unit 7 proceed to Steps S63 to S64, correct data where the error has occurred, and then write the corrected data in the flash memory 2 (step S64). The transfer operation indication unit and the ECC operation unit 7 continue the operation of Step S64 until the process where the corrected data is written in the flash memory 2 is completed. When writing in the flash memory 2 of all error corrections is completed, the transfer operation indication unit and the ECC operation unit 7 return to step S61 to shift the system to the idle state.

Steps S71 to S73 shown in FIG. 8C are process flow for writing data in the power supply OFF sequence of the system. First of all, in Step S71, the ECC operation unit 7 checks whether or not the error has occurred when the data is transferred to the external memory 3 from the flash memory 2. When the ECC operation unit 7 confirms that the error has not occurred, the CPU 5 executes the power supply OFF operation. When the ECC operation unit 7 confirms that the error has occurred, next, the ECC operation unit 7 proceeds to Steps S63 to S64, corrects data where the error has occurred, and then writes the corrected data in the flash memory 2. The ECC operation unit 7 continues the operation of Step S73 until the process where the corrected data is written in the flash memory 2 is completed. When writing in the flash memory 2 of all error corrections is completed, the transfer operation indication unit executes the power supply OFF process.

Although the most preferable concrete example about this invention was explained in detail, the combination and the array of parts of the preferred embodiment can change variously within the spirit and the range of this invention later claimed.

What is claimed is:

1. A program initiation control apparatus which reads programs in sequence from a first recording area via a second recording area, the first recording area having two or more memory blocks, each memory block including a record part group numbered in order, each comprising one or more memory pages, the program being stored in the aforementioned record part group, the second record area allowing random access in a unit smaller than the memory page, the program initiation control apparatus comprising:

an internal memory configured to store a system initialization program included in the programs;

a CPU configured to read the system initialization program from the first recording area and transfer the read system initialization program to the internal memory, and then read the system initialization program from aforementioned internal memory and execute the system initialization and initialization of the second recording area;

a DMA control unit configured to transfer the system initiation program and a system control program included in the programs from the first recording area to the second recording area without through the CPU;

an ECC operation unit for executing ECC operation of the program being transferred by the DMA control unit; and a memory management unit configured to manage a processing state of the transfer of the system control program to the second recording area by the DMA control unit; wherein:

the DMA control unit is further configured to transfer the system control program to the second recording area from the first recording area in parallel with execution of system initiation after the CPU reads the system initiation program transferred to the second recording area, and when the DMA control unit transfers the system initiation program and a system control program from the first recording area to the second recording area, the ECC operation unit simultaneously executes the ECC operation of the programs which are being transferred.

2. The program initiation control apparatus according to claim 1, wherein:

the internal memory stores the system initialization program read from the first recording area when a power supply is turned ON;

the CPU enables access to the second recording area by reading the system initialization program from the internal memory and initializing the system according to the aforementioned system initialization program;

the DMA control unit repeats a process of reading the system initiation program required at the minimum for system initiation included in the program from the first recording area by one-page unit after the system initialization and transfers the read program to the second recording area until the process of transferring the system initiation program required at the minimum in the required number of pages for system initiation is completed;

the memory management unit checks whether or not the program read from the second recording area by the CPU is stored in the second recording area;

when the memory management unit confirms that the system initiation program required at the minimum in the required number of pages for system initiation is stored in the second recording area, the CPU reads the system initiation program required at the minimum in the required number of pages for system initiation from the second recording area and then initiates the system; and the DMA control unit repeats the process of reading the system control program from the first recording area by one-page unit and transferring the read system control program to the second recording area without through the CPU, in parallel with the system initiation of the CPU and the system operation subsequent to the system initiation, until the transfer process of all of the system control program is completed.

3. The program initiation control apparatus according to claim 1, wherein
the CPU reads the stored program from the second recording area and then controls the system, during the transfer process of the program by the DMA control unit.

4. The program initiation control apparatus according to claim 3, wherein
when the CPU reads a program non-stored area in the second recording area, the memory management unit makes the reading process by the CPU stand by until the program transfer process to the aforementioned program non-stored area is completed.

5. The program initiation control apparatus according to claim 3, wherein
the ECC operation unit executes the ECC operation of the program being transferred by one-page unit, and
the DMA control unit transfers the program by plural page unit.

6. The program initiation control apparatus according to claim 5, wherein:
when the ECC operation unit detects the occurrence of a 1-bit error, the ECC operation unit corrects the detected 1-bit error; and
the DMA control unit comprises a buffer for one page or more, and transfers data in which the 1-bit error was corrected to the second recording area.

7. The program initiation control apparatus according to claim 6, wherein
the ECC operation unit notifies the occurrence of the 1-bit error to the CPU and the memory management unit.

8. The program initiation control apparatus according to claim 7, wherein
the CPU and the memory control unit write the data for one memory block of the second recording area including the data after the correction in an area different from the area before correction of the first recording area based on the notice of the occurrence of the 1-bit error, and then read data from the different area in the first recording area at the time of next reading.

9. The program initiation control apparatus according to claim 8, wherein
the CPU and the memory management unit perform writing operation after the notice of the occurrence of the 1-bit error.

10. The program initiation control apparatus according to claim 8, wherein
the CPU and the memory management unit write the data for one memory block of the second recording area including the data after the correction in an area different from the area before correction in the first recording area during an idle period of the system by recording the sector of the first recording area where the occurrence of the 1-bit error was notified.

11. The program initiation control apparatus according to claim 8, wherein
the CPU and the memory management unit write the data for one memory block of the second recording area including the data after the correction in an area different from the area before correction in the first recording area at a power supply OFF sequence by recording the sector of the first recording area where the occurrence of the 1-bit error was notified.

12. The program initiation control apparatus according to claim 4, wherein
the memory management unit manages an address in the second recording area where the program transfer was executed and an address in the second recording area that the CPU reads.

13. The program initiation control apparatus according to claim 5, wherein
the memory management unit transfers the program to the second the recording area from the first recording area by a page unit, and, when the reading process by the CPU is made to stand by, manages the transfer of the program by the CPU by a page unit by notifying such effect to the DMA control unit.

14. The program initiation control apparatus according to claim 4, wherein
the memory management unit manages an address in the second recording area where the program transfer was executed and an address in the second recording area that the CPU reads, by means of software.

15. The program initiation control apparatus according to claim 4, wherein
when the reading process by the CPU is made to stand by, the memory management unit notifies said effect to the DMA control unit and interrupts the reading process by a page unit, and when the reading process is restarted, the memory management unit gives priority to the transfer of the program in the first recording area that corresponds to an address in the second recording area that the CPU reads.

16. The program initiation control apparatus according to claim 3, wherein:
the program transferred to the second the recording area from the first recording area is divided into the plural program units; and
the CPU transfers programs sequentially from the program unit needed in the process with a high process priority in the system.

17. An image pickup apparatus comprising:
the program initiation control apparatus according to claim 1;
an image sensor; and
an image display monitor.

18. The program initiation control apparatus according to claim 1, wherein the second recording area is constituted by a single memory unit.

* * * * *